United States Patent
Weigl et al.

(10) Patent No.: US 8,723,073 B2
(45) Date of Patent: May 13, 2014

(54) ILLUMINATION APPARATUS AND METHOD FOR CONTROLLING ENERGY OF A LASER SOURCE

(75) Inventors: Bernhard Weigl, Steinheim (DE); Rick Sandstrom, Encinitas, CA (US)

(73) Assignees: Cymer, LLC, San Diego, CA (US); Carl Zeiss Laser Optics GmbH (DE)

( * ) Notice: Subject to any disclaimer, the term of this patent is extended or adjusted under 35 U.S.C. 154(b) by 1535 days.

(21) Appl. No.: 12/027,442

(22) Filed: Feb. 7, 2008

(65) Prior Publication Data

US 2009/0201955 A1 Aug. 13, 2009

(51) Int. Cl.
*B23K 26/00* (2014.01)

(52) U.S. Cl.
USPC ............ 219/121.65; 219/121.61; 219/121.75; 219/121.85

(58) Field of Classification Search
CPC .................................................. B23K 26/0081
USPC ........ 372/29.011; 219/121.6, 121.65, 121.66, 219/121.61, 121.62, 121.76, 121.77
See application file for complete search history.

(56) References Cited

U.S. PATENT DOCUMENTS

| | | | |
|---|---|---|---|
| 5,331,466 A * | 7/1994 | Van Saarloos | 359/723 |
| 5,414,559 A * | 5/1995 | Burghardt et al. | 359/623 |
| 5,609,780 A * | 3/1997 | Freedenberg et al. | 219/121.73 |
| 5,721,416 A | 2/1998 | Burghardt et al. | |
| 5,880,461 A * | 3/1999 | Spear | 250/208.2 |
| 6,930,314 B2 * | 8/2005 | Jackson et al. | 250/458.1 |
| 7,061,959 B2 | 6/2006 | Partlo et al. | |
| 2005/0141580 A1 * | 6/2005 | Partlo et al. | 372/55 |
| 2006/0209310 A1 | 9/2006 | Muenz et al. | |

FOREIGN PATENT DOCUMENTS

WO WO 2006/066706 A2 6/2006

OTHER PUBLICATIONS

Le Maire et al., U.S. Appl. No. 60/731,539, entitled "Beam Separating Optical Element," filed Oct. 28, 2005.
Shklover et al., U.S. Appl. No. 60/753,829, entitled "Method and device for reducing divergence of a laser beam," filed Dec. 23, 2005.
Muenz et al., U.S. Appl. No. 11/318,127, entitled "Optical Illumination System for Creating a Line Beam," filed Dec. 22, 2005.
U.S. Appl. No. 60/731,539, filed Oct. 28, 2005.
U.S. Appl. No. 60/753,829, filed Dec. 23, 2005.

* cited by examiner

*Primary Examiner* — Mark Paschall
(74) *Attorney, Agent, or Firm* — Procopio, Cory, Hargreaves & Savitch LLP; Noel C. Gillespie (57) ABSTRACT

The disclosure relates to an illuminating apparatus for illuminating a sample on a work stage, optionally with a relatively narrow illuminating line of relatively controlled energy, as well as methods for controlling energy of a laser source when illuminating a sample on a work stage with a relatively narrow illuminating line.

20 Claims, 4 Drawing Sheets

ILLUMINATION APPARATUS AND METHOD FOR CONTROLLING ENERGY OF A LASER SOURCE

FIELD

The disclosure relates to an illuminating apparatus for illuminating a sample on a work stage, optionally with a relatively narrow illuminating line of relatively controlled energy, as well as methods for controlling energy of a laser source when illuminating a sample on a work stage with a relatively narrow illuminating line.

BACKGROUND

Many technical applications in electronics and display technology use a thin polycrystalline silicon (Si) layer on glass. Such panels are typically used for liquid crystal display (LCD), organic light emitting diode (OLED) and solar cell technology. The standard process to produce such panels is to first deposit amorphous Si layers on glass by chemical vapour deposition (CVD) or sputter processes. Subsequently a polycrystalline film is formed by laser annealing such as excimer laser crystallization (ELC) or sequential lateral solidification (SLS) techniques. An overview of these different common techniques is given e.g. in U.S. Pat No. 7,061,959 which is herewith incorporated by reference.

A technique for conversion of amorphous silicon into polycrystalline silicon is the so called thin beam directional x-tallization (TDX) process. This process uses a pulsed narrow narrowly focused laser line with a width (so called short axis) dimension of about 10 µm and a longitudinal (so called long axis) dimension of about 500 mm which is scanned in the short axis direction in order to melt the thin Si layer having a thickness of 30 to 100 nm.

When applying the ELC, SLS or TDX processes a thin silicon layer on glass is typically melted by an illumination line being emitted by a high energy excimer laser, such as a XeCl excimer laser, and shaped by beam shaping optics which generally perform at least one of the following: 1) changing the shape and/or divergence in one or two directions perpendicular to the direction of beam propagation; 2) homogenizing the intensity at a field and/or pupil plane in one and/or two directions; and/or 3) changing the spatial and/or temporal coherence.

After having shaped the beam with the beam shaping optics the beam usually has a rectangular cross section which upon further propagation scales in size in the long and/or the short axis direction.

The energy density of the laser line on the silicon layer can be homogenous in the long axis direction and lie within a certain process window. The theoretical process window is reduced by effects like long axis uniformity fluctuations, beam position and pointing fluctuations, variations of the Si film thickness and/or a variation of the overall energy reaching the panel. The latter is often induced by variations of beam parameters of the laser that influence the transmission of the optical system. For these reasons the relevant process parameters have to be measured and stabilized.

Usually, the laser energy is stabilized by a feed back loop that measures the energy close to the exit window of the laser. This is the most frequently used laser energy stabilization technique since nearly each commercially available laser is equipped with such a feedback loop. A laser annealing system comprising such a laser energy stabilization system works quite well, however, it does not prevent variations of energy density along the laser line on the silicon layer leading to poor crystal quality when using the TDX process.

SUMMARY

In one aspect, the disclosure features an illuminating apparatus that includes: a beam shaping optical system configured to shape a laser beam into a line-shaped laser beam, the laser beam being emitted during use by a laser source and propagating through the illuminating apparatus along a beam path; an energy measuring device configured to measure an energy of the line-shaped laser beam; an energy control system configured to generate a control signal based on the measured energy of the laser beam, the energy control system being configured to control energy output of the laser source and/or transmission of one or more components of the beam shaping optical system based on the control signal. The energy measuring device is in the beam path between the beam shaping optical system and a work stage. The illuminating apparatus is configured to illuminate a sample with the line-shaped laser beam when the sample is on the work stage. At the sample, the line-shaped laser beam has a dimension in a first direction that exceeds a dimension in a second direction perpendicular to the first direction.

In another aspect, the disclosure features a method that includes: shaping a laser beam into a line-shaped laser beam with a beam shaping optical system, the laser beam being emitted during use by a laser source; measuring an energy of the line-shaped laser beam; generating a control signal based on the measured energy of the line-shaped laser beam; and controlling an energy output of the laser source and/or transmission of one or more components of the beam shaping optical system based on the control signal. The energy of the line-shaped laser beam is measured at a location of a path of the line-shaped laser beam that is between the beam shaping optical system and a work stage. The illuminating apparatus is configured to illuminate a sample with the line-shaped laser beam when the sample is on the work stage. At the sample, the line-shaped laser beam has a dimension in a first direction that exceeds a dimension in a second direction perpendicular to the first direction.

In a further aspect, the disclosure features an illuminating apparatus that includes: a beam shaping optical system configured to shape a laser beam into a line-shaped laser beam; an energy measuring device configured to measure an energy of the line-shaped laser beam; and an energy control system configured to generate a control signal based on a measured energy of the line-shaped laser beam, and the energy control system being configured to control energy output of the laser source based on the control signal. The control signal is indicative of an averaged energy of the line-shaped laser beam along a first direction. The illuminating apparatus is configured to illuminate a sample with the line-shaped laser beam when the sample is on the work stage. At the sample, the line-shaped laser beam has a dimension in the first direction that exceeds a dimension in a second direction perpendicular to the first direction.

In an additional aspect, the disclosure features a method that includes: shaping a laser beam into a line-shaped laser beam; measuring an energy of the line-shaped laser beam; generating a control signal based on a measured energy of the line-shaped laser beam; and controlling an energy output of a laser source that creates the laser beam based on the control signal. The control signal is indicative of an averaged energy of the line-shaped laser beam along a first direction. The illuminating apparatus is configured to illuminate a sample with the line-shaped laser beam when the sample is on the work stage. At the sample, the line-shaped laser beam has a dimension in the first direction that exceeds a dimension in a second direction perpendicular to the first direction.

In some embodiments, the disclosure provides an illuminating apparatus and method for controlling energy of a laser source with improved reduction of variations of energy density of the laser line on the sample being illuminated.

Because some beam parameters, such as pointing, divergence, and polarization, can change over time, the transmission through the beam shaping optics is subjected to change. This can influence the energy density on the panel.

In certain embodiments, the disclosure provides an illuminating apparatus for illuminating a sample on a work stage with a narrow illuminating line of controlled energy, whereby the illuminating line is emitted from a laser, the illuminating line has an dimension in a first direction and a dimension in a second direction perpendicular to the first direction whereby the first direction dimension exceeds the second direction dimension by a multiple. The illumination apparatus includes a beam shaping optical system for shaping the laser beam into a line shape, an energy measuring device for measuring energy of the laser beam, and an energy control system for generating a control signal upon the measured laser beam energy and for controlling the energy output of the laser source based on the control signal, whereby the energy measuring device is arranged in the beam path after the beam shaping optical system and before the work stage. The energy measuring device, in the following for simplicity called process energy monitor (PEM) measures the energy incident on the panel and feeds a signal back to the control loop of the laser.

In some embodiments, the illumination apparatus can be used in laser annealing and/or laser crystallization purposes, such as related to ELC, SLS or TDX processes. In certain embodiments, the illumination apparatus can be used any laser light exposures involving a relatively thin illuminating line having a high aspect ratio of e.g. several hundreds or even thousands.

It has been found that, in at least some instances, energy measurement relying only on a fraction of the beam at an outer edge may deliver a useful control signal only if the energy at the outer edge is a good measure of the total beam energy. Often, this will not be the case. Therefore, in some embodiments, the control signal is generated such that it is indicative of an averaged beam energy along the dimension of the line shaped beam in an appropriate direction, e.g., the larger dimension.

It can be challenging to place an energy meter directly in the beam path of an illuminating apparatus without disturbing beam performance and/or output energy. One solution may be that the energy measuring device includes a beam splitter for coupling out a fraction of the line shaped beam and a detector for detecting the fraction. In general, the detector may be an array of any kind that is capable of detecting laser light. As an example, the detector may be a two dimensional array having sensors in two dimensions or a one dimensional array having light detecting elements only in one direction, e.g., oriented in the long axis direction. In some embodiments, the detector includes a plurality of photodiodes arranged side by side in a direction, e.g., the long direction, for collecting the fraction. These photodiodes may be arranged such that a few rows of photodiodes form a two dimensional sensor array. Optionally, the photodiodes are in a one dimensional array placed side by side.

In some embodiments, the illumination apparatus includes a plurality of spherical lenses for focusing the fraction onto the plurality of photodiodes. This can, for example, reduce the number of photodiodes. Other focusing lenses may optionally be used. Examples include cylindrical lenses and double cylindrical lenses with cylindrical surfaces transversely crossing each other. Nevertheless, spherical lenses may offer certain manufacturability advantages.

Optionally, the illuminating apparatus can include reducing optics in the beam path after the beam shaping optical system for reducing the line shaped beam in the second (shorter) direction. The energy measuring device may be located in the beam path direction before or after the reducing optics. In some embodiments, the energy measuring device may also be located in the reducing optics itself. When the beam is narrowed significantly by the reducing optics the collection (and the subsequent detection) of the most relevant part of the beam may be easier.

In certain embodiments, the illumination apparatus includes imaging optics for imaging the line shaped beam onto the sample. The imaging optics may include the reducing optics. Beam imaging may improve illuminating line properties on the sample, e.g., the panel.

In some embodiments, the beam shaping optical system includes a homogenizer for homogenizing the laser beam at least along its dimension in the first (longer) direction. The energy measuring device is thus located in the beam path after the homogenizer. Typical homogenizers for use in the beam shaping optical system are disclosed in U.S. Pat. No. 5,721,416 A1 or WO 2006/066706 A2.

In some embodiments, the beam shaping optical system includes a field defining optical device for defining the dimension of the laser beam at least in the second (shorter) direction. U.S. Pat. No. 5,721,416 A1, U.S. 60/731,539, and U.S. 60/753,829 disclose exemplary arrangements for defining or limiting the dimension of the laser beam at least in the second (shorter) direction.

In some embodiments, the disclosure provides a method for controlling the energy of a laser source when illuminating a sample on a work stage with a narrow illuminating line, whereby the illuminating line is generated from a laser beam propagating along a beam path and is emitted from the laser source and has an dimension in a first direction that exceeds a dimension in a second direction perpendicular to the first direction by a multiple. The method includes shaping the laser beam into a line shape, and measuring the energy of the laser beam in the beam path after the beam shaping optical system and before the work stage. The method also includes generating a control signal upon the measured laser beam energy, and controlling energy output of the laser source based on the control signal.

In certain embodiments, the control signal is indicative of an averaged beam energy along the dimension of the line shaped beam in the first (longer) direction. In some instances, it is believed that relying only on a fraction at an outer edge of the beam can be disadvantageous because the energy at the outer edge in general might not reflect the energy of the total beam.

In some embodiments, the method includes splitting the laser beam in the beam path after the beam shaping optical system and before the work stage and coupling out a fraction and detecting the fraction.

Optionally, the method includes averaging a beam energy of the fraction along the dimension of the fraction in the first (longer) direction. In some instances, averaging the beam energy in the second (shorter) direction can be avoided. Averaging the beam energy along the dimension in the first (longer) direction can provide enough information for generating a control signal. The averaging may optionally be done by integrating the beam energy along the long axis direction only. In certain instances, weighing the signal with respect to the length being integrated can be avoided.

In certain embodiments, the method includes dividing the fraction into a plurality of beamlets and focusing the plurality of beamlets onto a detector array comprising e.g. a plurality of photodiodes. Optionally, pyroelectric and/or thermoelectric sensors can be used. This can reduce the number of detector array elements such as photodiodes, and/or enhance the efficiency with which collection the beam dimension in total is made. Focusing of a plurality of beams can also provide the advantage that an adjustment of the detector with respect to the beam to be detected may be realized much easier than without having any focusing mechanism.

In some embodiments, the method includes reducing the line shaped beam in the second (shorter) direction. The energy may be measured in the beam path direction before, after or during reducing the line shaped beam in the second direction.

Optionally, the method can include imaging the line shaped beam onto the sample or panel. Imaging the beam has the advantage of being able to after the illuminating line properties at the intermediate field plane and thus on the sample or panel.

In certain embodiments, the method includes homogenizing the laser beam at least along the first (longer) direction. The beam energy may be measured in the beam path after homogenizing the laser beam.

In some embodiments, the disclosure provides an illuminating apparatus for illuminating a sample on a work stage is provided with a narrow illuminating line of controlled energy, where the illuminating line is generated from a laser beam propagating along a beam path, emitted from a laser source and has an dimension in a first direction exceeding an dimension in a second direction perpendicular to the first direction by a multiple. The apparatus includes a beam shaping optical system for shaping the laser beam into a line shape, and an energy measuring device for measuring energy of the laser beam. The apparatus also includes an energy control system for generating a control signal, which is indicative of an averaged beam energy along the dimension of the line shaped beam in the first direction and also indicative of the measured laser beam energy and for controlling energy output of the laser source as a result of the control signal.

The energy measuring device can include a beam splitter for coupling out a fraction of the line shaped beam and a detector for detecting the fraction.

The detector optionally includes a plurality of photodiodes being arranged side by side in the first (longer) direction for collecting the fraction as is explained above.

The may include a plurality of spherical lenses for focusing the fraction onto the plurality of photodiodes. This can be used, for example, for simplicity reasons.

The at least two of the photodiodes may be electrically coupled in parallel. Coupling of photodiodes in parallel can result in an addition of the photocurrents being generated when illuminating the photodiodes. A current signal formed of an addition of photocurrents can correspond to an (not normalized) averaging of beam energy impinging on the photodiodes.

In general, voltage signals are used in order to control laser beam output of the laser. The voltage control signal may be generated by measuring the voltage drop along a shunt resistor that is electrically coupled in series to (at least one of) the photodiodes.

To keep the loss for measuring the intensity small, for example, one may optionally use reverse biased photodiodes which may also facilitate time resolved detection of the short excimer laser pulses if desired.

Examples for detection of optical signals are given in Dereniak and Crowe: Optical Radiation Detectors (Wiley) which is incorporated by reference herein.

The laser output may be controlled by an electronic feed back loop. The input signal may be generated by several photodiodes. The charge that is generated by the laser pulse in each photo diode may be added electronically. In order to keep dark currents low, it is possible that the photodiodes are not biased.

In some embodiments, the disclosure provides a method for controlling energy of a laser source when illuminating a sample on a work stage with a narrow illuminating line is provided, whereby the illuminating line is generated from a laser beam propagating along a beam path and being emitted from the laser source and having an dimension in a first direction exceeding an dimension in a second direction perpendicular to the first direction by a multiple. The method includes shaping the laser beam, measuring the energy of the shaped laser beam, and generating a control signal upon the measured laser beam energy, whereby the control signal is indicative of an averaged beam energy along the dimension of the line shaped beam in the first direction and controls the energy output of the laser source based on the control signal.

Optionally, a fraction of the line shaped beam is coupled out and subsequently detected. The fraction can be divided into a plurality of beamlets. Each of the beamlets can be detected separately. Each of the beamlets can be focused separately for detection. The method can include converting detection signals generated upon detecting each of the beamlets separately into a sum signal. Such a sum signal can represent an averaging of the detected beam. The sum signal may subsequently be converted into the control signal, for example, in the manner described above.

BRIEF DESCRIPTION OF THE DRAWINGS

The disclosure will be described hereinafter with reference to the drawings, in which.

DETAILED DESCRIPTION

Figure 1:
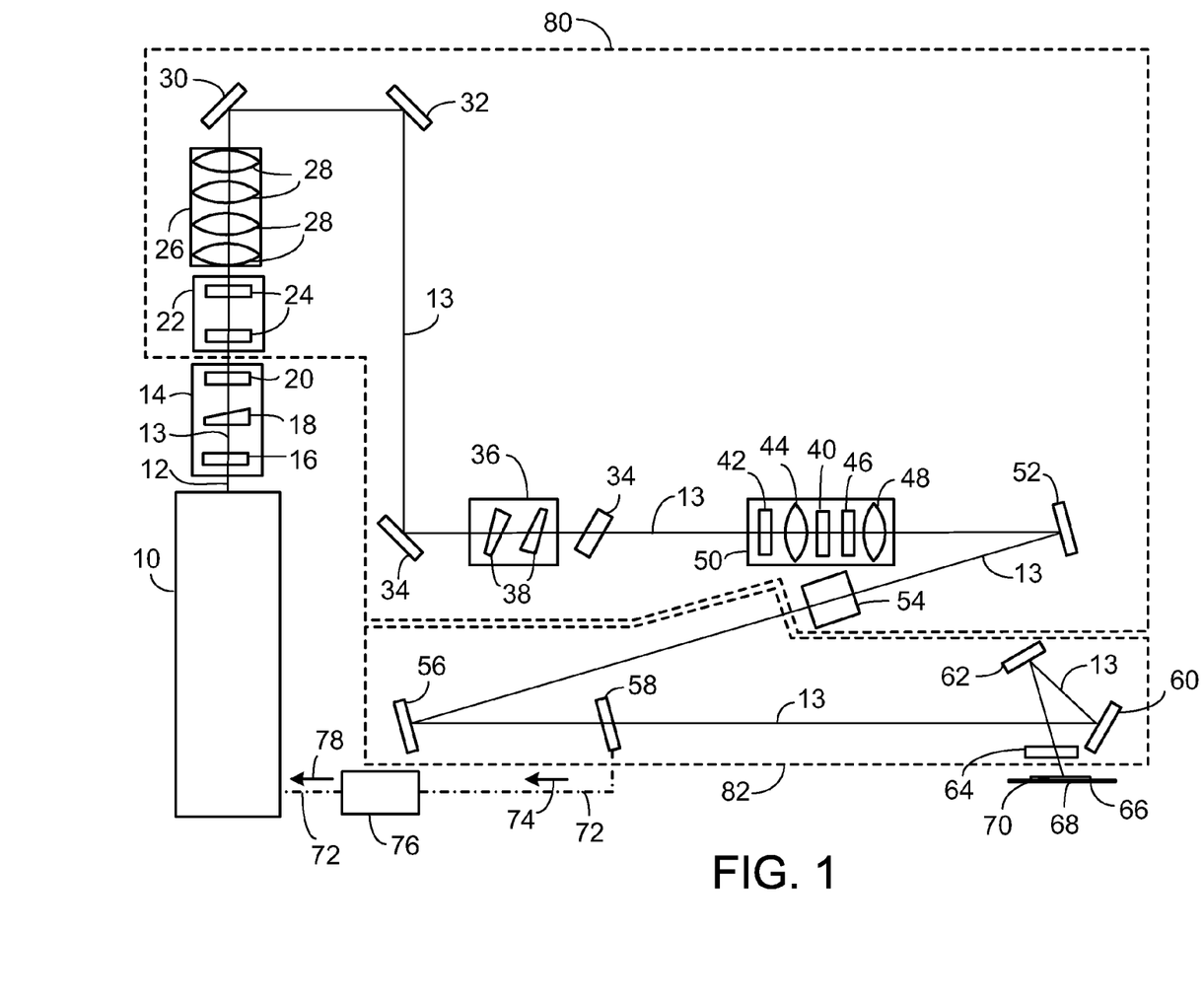
FIG. 1 is a schematic representation of a TDX apparatus.

FIG. 1 shows a schematic drawing of an illuminating apparatus, in particular for applying the above mentioned TDX process. This TDX tool includes as a light source an excimer laser 10, such as a XeCl-excimer laser emitting a pulsed laser beam 12. Typical pulse widths are 10-30 ns at a typical repetition rate of 100 Hz-10 kHz. The Energy of such a laser pulse is typically in the range of 100 mJ-1000 mJ.

This laser beam 12 with typical rectangular cross section of 10×30 mm is directed along a beam path 13 and converted into a narrow illuminating line 70 via an optical system described in detail in the following. The illuminating line 70 on the sample/panel 66 typically has a dimension in a long axis direction transverse to the scanning direction of at least 200 mm and a dimension in a short axis direction, i.e. in scan direction, of 3 to 7 µm. The illuminating line 70 typically has a ratio of the dimension of its long axis to the dimension of its short axis of at least $2.5 \times 10^4$ (e.g., at least $5 \times 10^4$, at least $7.5 \times 10^4$, at least $1 \times 10^5$). The illuminating line 70 with high aspect ratio illuminates a sample such as a panel 66 positioned on a work stage 68. The work stage 68 is typically moved with a stage scanning speed of around 10 mm/s resulting in a typical scan increment of e.g. 2 μm/pulse.

After having left the laser 10 the light beam 12 is directed to a so called beam delivery unit (BDU) 14. This BDU 14 has an entrance window 16, a pulse stretcher 18 for lengthening the pulse width by a factor of from 2 to 16. The lengthened laser pulse 12 exits the BDU 14 via an exit window 20.

In the following the cross section of the laser beam 12 is converted from a rectangular one into a line shape. For this purpose the laser beam 12 is first directed to a beam preconditioning unit (BPU) 22. The BPU 22 has a plurality of optical elements 24. This arrangement of optical elements 24 serves for flattening the intensity profile of the laser beam 12.

The beam expanding unit (BEU) 26 is arranged in the beam path 13 after the BPU 22 and serves for expanding the laser beam 12 in a lengthwise direction. Hereinafter the lengthwise direction is indicated with the reference character x, the width direction of the laser beam is labelled with the reference character y. In the present case the dimension of the laser beam 12 is carried out via four lenses 28 being arranged one after the other on the beam path 13. Instead of the use of such lenses also, bent mirrors can be used.

For shortening the total dimension of the illuminating apparatus, a plurality of plane mirrors may be used. For example, three mirrors 30, 32, 34 fold the beam path 13 before the laser beam 12 enters a beam stability metrology unit (BSMU) 36. The beam stability metrology unit 36 includes an arrangement of optical elements 38 movable in different directions in order to adjust and/or correct e.g. the pointing and/or position of the laser beam 12. Respective laser beam monitoring devices (not shown here) are located at the exit of the BSMU 36. Details are e.g. disclosed in U.S. Pat. No. 7,061,959.

A homogenizing unite 40 follows the BSMU 36 in the beam path 13. The homogenizing device 40 is designed to homogenize the expanded line shaped laser beam 12. Homogenizer 40 in the example according to FIG. 1 includes a cylindrical lens array 42 followed by a lens 44, a further cylindrical lens array 46, a rod 48 and a condenser 50. U.S. Pat. No. 5,721,416 A1 or WO 2006/066706 A2 disclose a plurality of different homogenizers that are capable of being inserted in addition or alternatively into the beam path 13 where the homogenizer 40 is located.

Subsequently, the laser beam 12 is directed to folding mirror 52 and in the following to field defining unit (FDU) 54. FDU 54 defines dimension of the laser beam 12 in a field plane and in particular in the panel plane 66 in short axis direction y. A FDU 54 may, for example, include an arrangement as described in U.S. Pat. No. 5,721,416 or alternatively one of the arrangements as disclosed in U.S. Ser. No. 60/731,539 or U.S. Ser. No. 60/753,829.

Because the optical elements following BDU 14 in optical beam path 13 until the exit of FDU 54 shape the laser beam 12 from a raw laser beam with rectangular cross section into a line beam with a target homogeneous intensity distribution along the long axis direction, the respective arrangement of optical elements in the following is called a beam shaping unit (BSU). The dashed line identified with the reference numeral 80 in FIG. 1 encircles in the aforementioned optical elements of the BSU.

When leaving the BSU 80 the rectangular cross section shaped laser beam 12 is directed to combined imaging, reducing and folding optics 82 that include a plurality of plan or cylindrical mirrors 56, 60, 62, respectively. Instead of an arrangement of mirrors 56, 60, 62, a plurality of cylindrical lenses or a combination of lenses and mirrors may be used. Typical setups are e.g. disclosed in WO 2006/066706 A2 or in U.S. Pat. No. 5,721,416. The laser beam 12 leaves the imaging, reducing and folding optics 82, which for simplicity reasons in the following is called beam projection unit (BPU) 82, through an exit window 64. The laser beam 12 having an expanded long axis dimension and a reduced short axis dimension as compared to its dimensions when leaving the BSU 80 is focused as the narrow illuminating line 70 on the panel 66, which is typically covered with an amorphous silicon layer, on the work stage 68.

Figure 2:
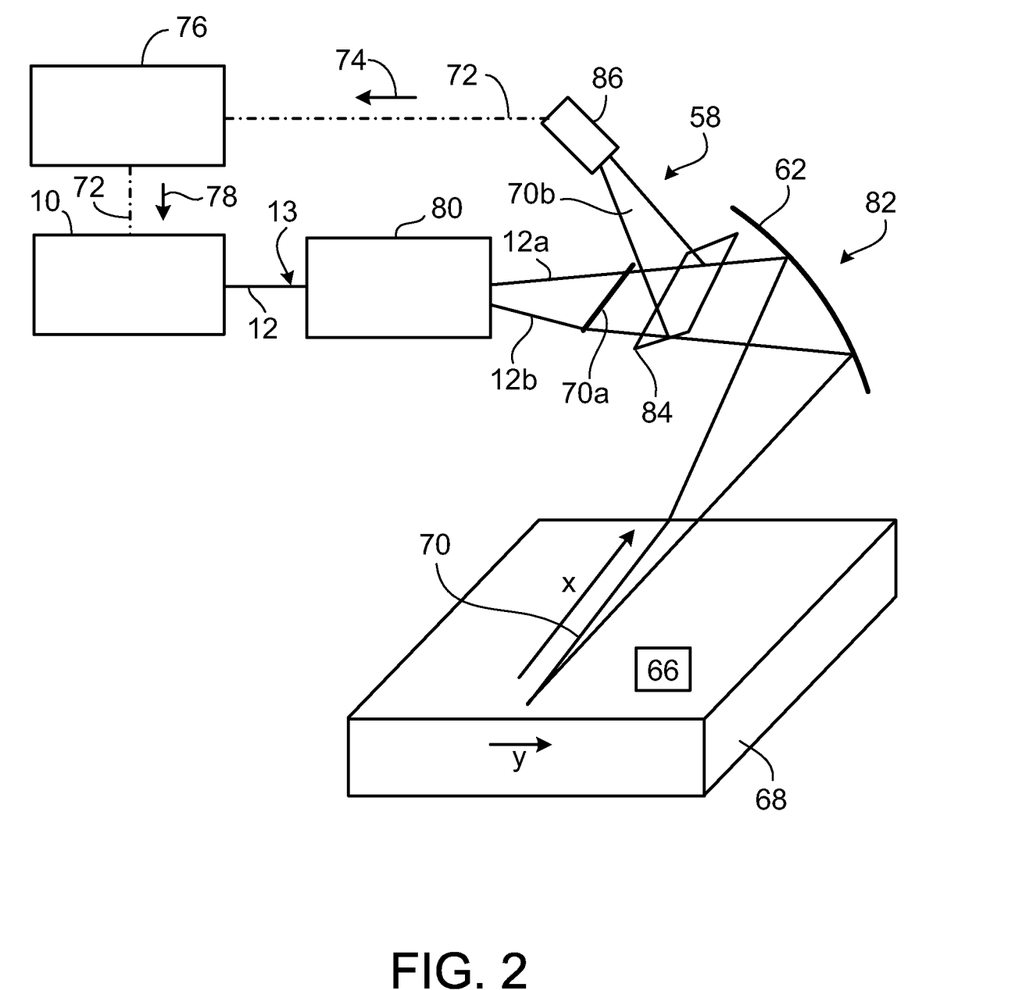
FIG. 2 is a schematic representation of a portion of the TDX apparatus shown in FIG. 1.

FIG. 2, which summarizes certain features of the apparatus shown in FIG. 1, shows the light train as a block diagram. In particular, the laser source and the BSU are drawn as rectangular blocks indicated with the reference numerals 10 and 80, respectively, while the BPU 82 is represented solely by the aforementioned cylindrical mirror 62. For illustrative purposes the laser beam 12 entering the BSU 80 is indicated as a single straight line having a point cross section while the laser beam with its cross section further expanding in long axis direction when leaving the BSU 80 is indicated by two diverging lines 12a, 12b and a straight line 70a connecting these lines 12a, 12b, respectively. The illuminating line 70 focused on the panel 66 being positioned on the work stage 68 is indicated by a straight line, the long and short axis directions are indicated with reference numerals x and y, respectively.

Applicants recognized that because energy density on the panel is the most relevant process parameter, the pulse energy should be measured close to the panel 66 or at a location with corresponding energy density. This signal should be fed back to the stabilization circuit of the laser 10.

The energy density at the panel 66 is mostly given by the laser energy and the optical transmission through the optical system. Changes in system transmission are mostly generated in the beam shaping module 80 when parameters like pointing, beam divergence or polarization are changing. The influence on system transmission from the projection optics 82 is typically relatively small. Therefore suitable positions for energy measurements can be located along the beam path 13 in the projection module 82 or in the reflected beam from the panel. Therefore, an energy meter may be located in the beam path 13 between the exit of the BSU 80 and the panel 66.

There can be some advantages in positioning the sensor in the projection optics over a direct measurement in the panel level. There can be more space available and there is a smaller influence on image quality of the laser line. At some distance from the panel the line usually has not yet reached its full length and so it is easier to collect the light with a beam splitter.

Thus, in the specific embodiment shown in FIG. 1 the energy meter, in the following called process energy monitor (PEM) 58, is located between the mirrors 56 and 60. The PEM 58 includes a beam splitter 84, which might be a semitransparent window or a transparent window, and a detector 86 as is shown in FIG. 2. The main portion of the line shaped laser beam 12 hitting the front surface of the beam splitter 84 passes the beam splitter 84 and is further imaged and reduced forming the final illuminating line 70 on the panel 66. A fraction 70b of e.g. 0.05 to 0.5% is reflected on e.g. the rear surface of the beam splitter 84 and directed to the detector 86.

The detector 86 detects the fraction 70b (or at least a part thereof) and converts it into a measured signal 74, e.g. an electrical current or an electrical voltage. The measured signal 74 is fed back via a feed back loop 72 to a control device 76, such as a master controller which generates a control signal 78 for controlling the output energy of the laser beam source 10.

In order to detect a spatially resolved energy density one would often need a relatively large two-dimensional sensor. The feedback signal for the laser starts as an analog value that determines the laser energy. To get this signal a numerical (adding up recorded values), electrical (adding currents of photo sensitive elements) or optical integration (adding the light with lens elements) should be done. For the current problem with a narrow illuminating line, the solution can involve using an optical and an electrical averaging method.

Figure 3:
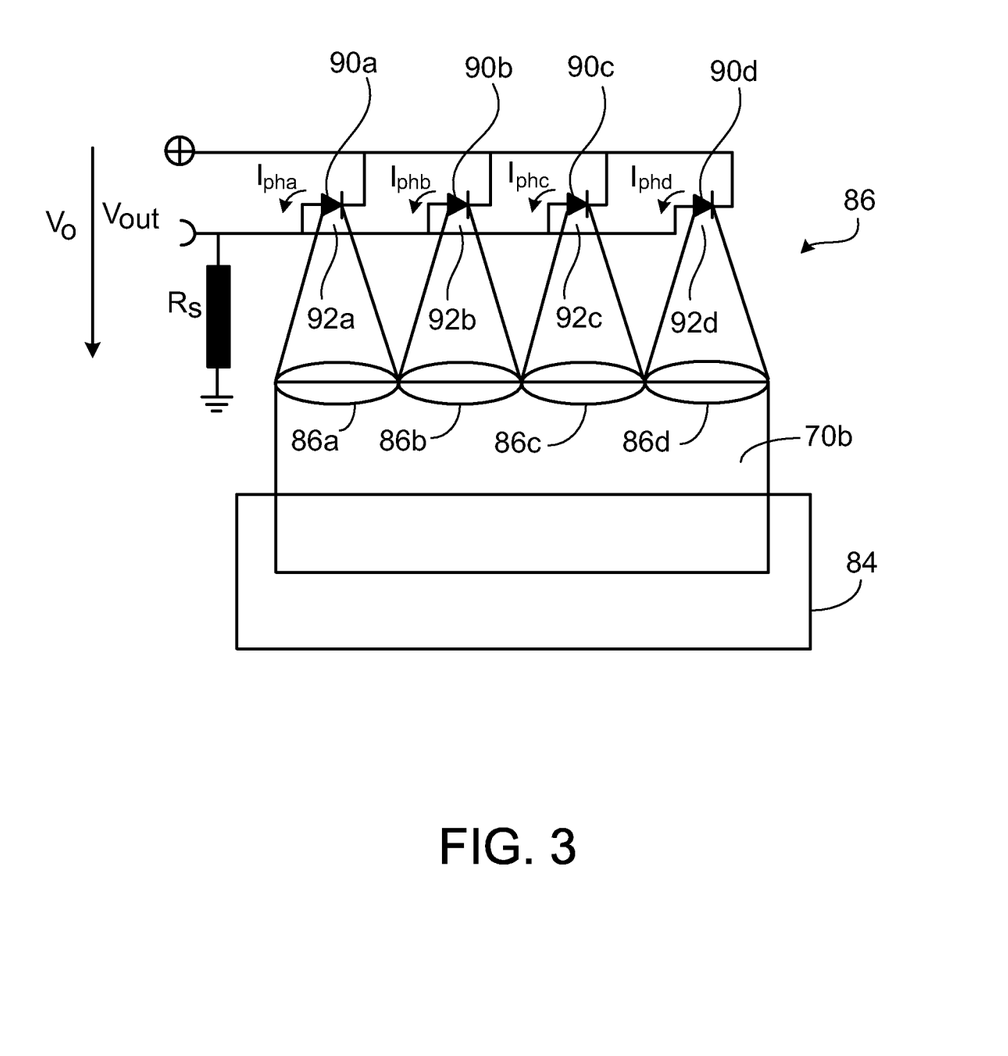
FIG. 3 shows an energy measuring device incorporated into the TDX apparatus of FIGS. 1 and 2.

FIG. 3 shows the energy measuring device 86 being part of the TDX apparatus according to FIGS. 1 and 2. Approximately 0.2% of the beam energy is coupled out with the aforementioned beam splitter 84 that is realized as a two sided antireflective (AR) coated glass plate. Most of the beam fraction 70b is focused onto four photodiodes 90a, 90b, 90c, 90d via four (e.g., relatively large) spherical lenses 88a, 88b, 88c, 88d dividing the fraction 70b into four individual beamlets 92a, 92b, 92c, 92d. The four photodiodes 90a, 90b, 90c, 90d are electrically connected in parallel and in combination electrically connected in series to a shunt resistor $R_s$. The electrical circuit comprising the photodiodes 90a, 90b, 90c, 90d and the shunt resistor $R_s$ is reverse biased by the reverse bias voltage $V_0$.

Upon illuminating the photodiodes 90a, 90b, 90c, 90d photocurrents $I_{pha}$, $I_{phb}$, $I_{phc}$, $I_{phd}$ are generated. The four individual photocurrents $I_{pha}$, $I_{phb}$, $I_{phc}$, $I_{phd}$ (which are in general not identical) are added on the single shared shunt resistor $R_s$. The control signal 78 needed for the feed back loop 72 is available at the output of this circuit as an output voltage $V_{out}$.

The four photodiodes 90a, 90b, 90c, 90d are electrically connected in parallel. The electrical circuit including the photodiodes 90a, 90b, 90c, 90d and an electronic circuit that adds up the individual charges, analyzes the sum signal and generates an output Voltage $V_{out}$. Upon illuminating the photodiodes 90a, 90b, 90c, 90d charges $Q_{pha}$, $Q_{phb}$, $Q_{phc}$, $Q_{phd}$ are generated. The four individual charges $Q_{pha}$, $Q_{phb}$, $Q_{phc}$, $Q_{phd}$ (which are in general not identical) are added in the electronic circuit. The control signal 78 needed for the feed back loop 72 is available at the output of this circuit as an output voltage $V_{out}$.

Instead of the above sensing device including four photodiodes 90a, 90b, 90c, 90d and an electronic circuit for read out, any number of sensor types and their supporting circuitry could be used (photodiode, photomultiplier, pyroelectric, photo resistive, photon drag, etc.).

Figure 4:
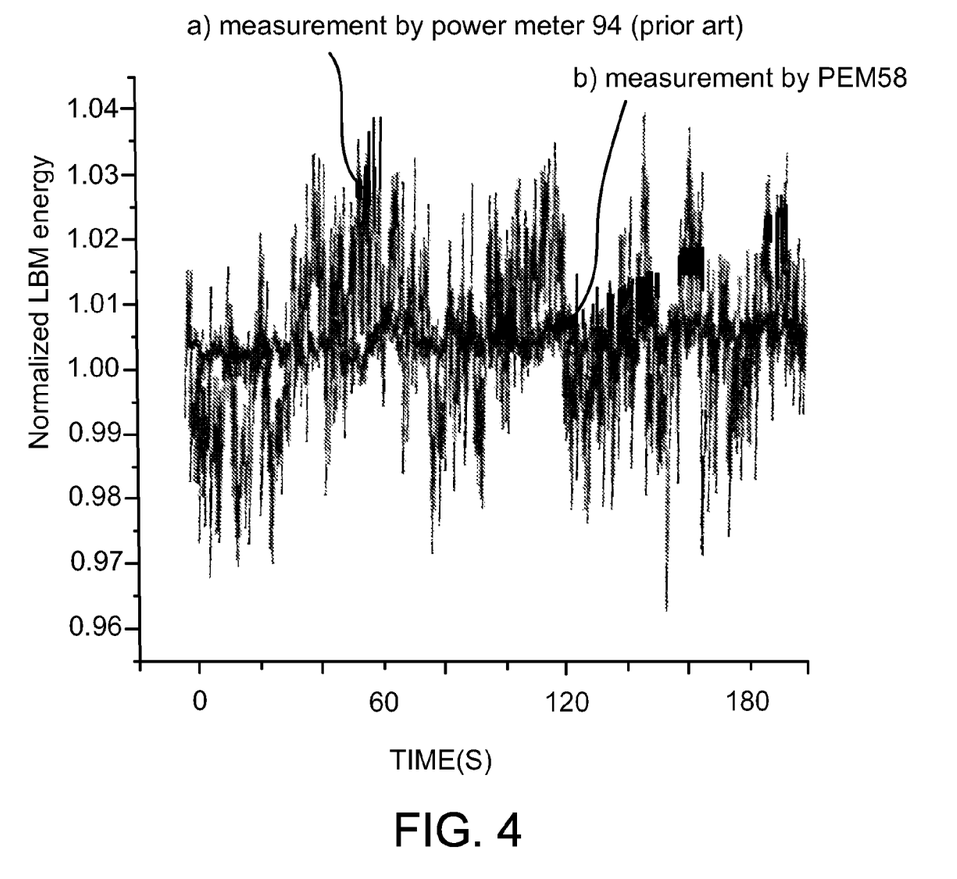
FIG. 4 shows exemplary energy fluctuations at a panel/sample when controlling laser output energy in two different systems.

When upgrading the TDX apparatus with the PEM device 58 a significant improvement of stability of energy density on the panel 66 and an enlarged process window is observed. FIG. 4 shows the normalized line beam energy in the panel plane 66 recorded with an energy meter (such as e.g. disclosed in U.S. Pat. No. 7,061,959). The thin lined curve shows the fluctuations without PEM 58 but an energy meter 94 being located in the beam path 13 between BSMU 36 and homogenizer 40 that are +/−3.5%. Using the PEM 58 in the beam path 13 between mirrors 56 and 60 for feedback control of the laser source 10 the fluctuations (bold curve) were reduced to +/−0.7%. As a result the useful process window could be enlarged by 5.5%.

U.S. Pat. No. 7,061,959 and U.S. Pat. No. 5,721,416 are hereby incorporated by reference. Published U.S. patent application 2006-0209310 is hereby incorporated by reference. U.S. Ser. No. 60/731,539, filed Oct. 28, 2005 and U.S. Ser. No. 60/753,829, filed Dec. 23, 2005, are incorporated herein by reference. Published international application WO 2006/066706 is hereby incorporated by reference.

A listing of the reference characters and corresponding elements/features follows.

10 excimer laser
12 laser beam
12a line
12b line
13 beam path
14 beam delivery unit (BDU)
16 entrance window
18 pulse stretcher
20 exit window
22 beam preconditioning unit (BPU)
24 arrangement of optical elements
26 beam expanding unit (BEU)
28 lens arrangement
30 mirror
32 mirror
34 mirror
36 beam stability metrology unit (BSMU)
38 arrangement of optical elements
40 homogenizer
42 cylindrical lens array
44 lens
46 cylindrical lens array
48 rod
50 condenser
52 mirror
54 field defining unit (FDU)
56 mirror
58 process energy monitor (PEM)
60 mirror
62 mirror
64 exit window
66 panel
68 work stage
70 illuminating line
70a line shaped beam
70b fraction of line shaped beam
72 feedback loop
74 measured signal
76 master controller
78 control signal
80 illumination system/beam shaping unit (BSU)
82 imaging optics/reducing optics/beam projection unit (BPU)
84 beam splitter/transparent mirror
86 detector
88a lens
88b lens
88c lens
88d lens
90a photodiode
90b photodiode
90c photodiode
90d photodiode
92a focused beam let
92b focused beam let
92c focused beam let
92d focused beam let
94 energy meter (prior art)
x first direction
y second direction
$V_0$ bias voltage
$V_{out}$ output voltage
$R_s$ shunt resistor $I_{pha}$ photocurrent
$I_{phb}$ photocurrent
$I_{phc}$ photocurrent
$I_{phd}$ photocurrent Other embodiments are in the claims.

What is claimed is:

1. An illuminating apparatus configured to illuminate a sample when the sample is in a work stage, the illuminating apparatus comprising:
    a beam shaping optical system configured to shape a laser beam into a line-shaped laser beam having a dimension in a first direction that exceeds a dimension in a second direction perpendicular to the first direction, the laser beam being emitted during use by a laser source and propagating through the illuminating apparatus along a beam path, the beam shaping unit comprising a homogenizer configured to homogenize the laser beam at least along the first direction;
    an energy measuring device configured to measure an energy of the line-shaped laser beam; and
    an energy control system configured to generate a control signal based on the measured energy of the laser beam, the energy control system being configured to control energy output of the laser source and/or transmission of one or more components of the beam shaping optical system based on the control signal,
    wherein the energy measuring device is in the beam path between the homogenizer of the beam shaping optical system and the work stage.

2. The illuminating apparatus according to claim 1, wherein the control signal is indicative of an average beam energy of the line-shaped laser beam along the first direction.

3. The illuminating apparatus according to claim 1, wherein the energy measuring device comprises:
    a beam splitter configured to couple out a fraction of the line-shaped laser beam to provide a coupled out fraction; and
    a detector configured to detect the coupled out fraction.

4. The illuminating apparatus according to claim 3, wherein the detector comprises a plurality of photodiodes arranged side by side in the first direction, the plurality of photodiodes being configured to collect the coupled out fraction.

5. The illuminating apparatus according to claim 4, wherein the detector further comprises a plurality of lenses configured to focus the coupled out fraction onto the plurality of photodiodes.

6. The illuminating apparatus according to claim 1, further comprising reducing optics configured to reduce a size of the line-shaped laser beam in the second direction.

7. The illuminating apparatus according to claim 1, further comprising imaging optics configured to image the line-shaped laser beam onto the sample.

8. The illuminating apparatus according to claim 1, wherein the beam shaping optical system comprises a field defining optical device configured to define the dimension of the laser beam in at least in the second direction.

9. The illuminating apparatus according to claim 1 wherein the laser beam represents a XeCl laser beam.

10. The illuminating apparatus according to claim 1 wherein a ratio of said dimension in said first direction to said dimension in said second direction is at least $2.5 \times 10^4$.

11. The illuminating apparatus according to claim 1 wherein the laser beam is a pulsed laser beam with a repetition rate between 100 Hz to 10 kHz.

12. The illuminating apparatus according to claim 5 wherein at least one of said plurality of lenses represents a spherical lens.

13. A method of illuminating a sample when the sample is in a work stage, the method comprising:
    shaping a laser beam into a line-shaped laser beam with a beam shaping optical system which comprises a homogenizer configured to homogenize the laser beam at least along the first direction;
    measuring an energy of the line-shaped laser beam;
    generating a control signal based on the measured energy of the line-shaped laser beam; and
    controlling an energy output of the laser source and/or transmission of one or more components of the beam shaping optical system based on the control signal,
    wherein the energy of the line-shaped laser beam is measured at a location of a path of the line-shaped laser beam that is between the homogenizer of the beam shaping optical system and the work stage.

14. The method according to claim 13, wherein the control signal is indicative of an averaged beam energy of the line-shaped laser beam along the first direction.

15. The method according to claim 13, further comprising:
    splitting the line-shaped laser beam to provide a coupled out fraction; and
    detecting the coupled out fraction.

16. The method according to claim 15, further comprising averaging an energy of the coupled out fraction along the first direction.

17. The method according to claim 16, further comprising:
    dividing the coupled out fraction into a plurality of beamlets; and
    focusing the plurality of beamlets onto a plurality of photodiodes.

18. The method according to claim 13, further comprising reducing the line-shaped laser beam in the second direction.

19. The method according to claim 13, further comprising imaging the line-shaped laser beam onto the sample.

20. The method according to claim 13, beam shaping comprises defining a dimension of the line-shaped laser beam at least in the second direction.

* * * * *